(12) United States Patent
Sugiyama et al.

(10) Patent No.: US 9,126,495 B2
(45) Date of Patent: Sep. 8, 2015

(54) ELECTRONIC CONTROL UNIT FOR AUTOMOBILE

(75) Inventors: Yasushi Sugiyama, Hitachinaka (JP);
Takuya Mayuzumi, Hitachinaka (JP);
Yasuhiko Okada, Isesaki (JP); Kiyoomi Kadoya, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 626 days.

(21) Appl. No.: 13/564,021

(22) Filed: Aug. 1, 2012

(65) Prior Publication Data

US 2013/0193754 A1 Aug. 1, 2013

(30) Foreign Application Priority Data

Sep. 20, 2011 (JP) .................................. 2011-204065

(51) Int. Cl.
| | | |
|---|---|---|
| *B60L 11/18* | (2006.01) | |
| *B60L 1/00* | (2006.01) | |
| *B60L 3/00* | (2006.01) | |
| *H02H 11/00* | (2006.01) | |
| *H02H 9/04* | (2006.01) | |

(52) U.S. Cl.
CPC .......... *B60L 11/1851* (2013.01); *H02H 11/003* (2013.01); *H02H 9/041* (2013.01)

(58) Field of Classification Search
None
See application file for complete search history.

(56) References Cited

U.S. PATENT DOCUMENTS

| | | | | |
|---|---|---|---|---|
| 6,084,384 | A | * | 7/2000 | Kawamoto et al. ........... 323/269 |
| 2004/0008070 | A1 | * | 1/2004 | Abe et al. ...................... 327/321 |
| 2004/0113599 | A1 | * | 6/2004 | Kojima et al. ................ 323/284 |

FOREIGN PATENT DOCUMENTS

| | | |
|---|---|---|
| CN | 102017351 A | 4/2011 |
| JP | 01-177865 | 7/1989 |
| JP | 01-177865 A | 7/1989 |
| JP | 03-26280 U1 | 7/1989 |
| JP | 07-244584 | 9/1995 |
| JP | 2002-175124 A | 6/2002 |
| JP | 2003-37933 A | 2/2003 |
| JP | 2010-062675 A | 3/2010 |
| JP | 2010-252470 A | 11/2010 |
| WO | WO 2009/135111 A2 | 11/2009 |

* cited by examiner

*Primary Examiner* — Jared Fureman
*Assistant Examiner* — Aqeel Bukhari
(74) *Attorney, Agent, or Firm* — Foley & Lardner LLP

(57) ABSTRACT

A reverse polarity protection circuit includes a p-channel MOSFET, an n-channel MOSFET, zener diodes, a coil that suppresses a backward flow of an electric current, a resistor that retains a voltage difference between a source of the p-channel MOSFET and a drain of the n-channel MOSFET, a resistor that protects the circuit if short-circuit destruction of the p-channel MOSFET occurs, a resistor that protects the circuit if short-circuit destruction of the n-channel MOSFET occurs, an electrolytic capacitor that suppresses fluctuation in an input voltage to a power supply control IC, a battery that supplies a voltage to an ECU, and the power supply control IC that generates a voltage for causing an IC in the ECU to operate.

8 Claims, 4 Drawing Sheets

ELECTRONIC CONTROL UNIT FOR AUTOMOBILE

CROSS-REFERENCE TO RELATED PATENT APPLICATIONS

Japan Priority Application 2011-204065, filed Sep. 20, 2011 including the specification, drawings, claims and abstract, is incorporated herein by reference in its entirety.

BACKGROUND OF THE INVENTION

1. Field of the Invention

The present invention relates to an electronic control unit for automobile and, more particularly, to a circuit of a power supply input section to a power supply control IC of the electronic control unit for automobile.

2. Description of the Related Art

In causing an electronic control unit for automobile (ECU) to operate, there is generally adopted a method of connecting a plus terminal of a battery and an ECU power supply input terminal and connecting a minus terminal of the battery to the GND to supply electric power to the ECU and cause the ECU to operate. However, it is likely that the terminals of the battery are reversely connected because of a human error. In the ECU in which measures against the reverse connection are not taken, an internal circuit is destroyed. Therefore, it is necessary to configure a reverse polarity protection circuit in an ECU power supply input section.

A method of connecting a diode to the power supply input section as the reverse polarity protection circuit has been used. If the battery is reversely connected, a path of an electric current flowing from a power supply control IC to the battery is cut off by a rectifying action of the diode. Therefore, a voltage applied to the power supply control IC drops to nearly 0 V.

However, in this system, if the battery is normally connected, a voltage drop equivalent to a forward voltage of the diode occurs. Therefore, when a battery voltage drops to, for example, about an operable voltage of the ECU, it is likely that a voltage for the ECU to operate is insufficient and ECU reset occurs.

JP-A-7-244584 discloses a technology of a reverse polarity prevention circuit in which an MOSFET is used instead of the diode and a voltage drop does not occur.

In the reverse polarity protection circuit in the past in which the diode is used, when the battery voltage drops, it is likely that a voltage necessary for the operation of the power supply control IC cannot be supplied and the ECU malfunctions. There is no conception and disclosure concerning protection of an FET in JP-A-7-244584. Therefore, in the reverse polarity prevention circuit disclosed in JP-A-7-244584, when a surge occurs from an input terminal, for example, the FET is destroyed because of the surge occurrence and an abnormal current flows from a power supply.

SUMMARY OF THE INVENTION

Therefore, it is an object of the present invention to provide a circuit configuration of a power supply input section in which a MOSFET is used instead of the diode and the MOSFET can be protected even when a surge occurs.

According to an aspect of the present invention, an electronic control unit for automobile includes: a first FET connected between a vehicle-mounted battery and a power supply control IC that lowers an output voltage from the vehicle-mounted battery to a predetermined value; a second FET configured to control ON and OFF of the first FET; a first resistor connected in series between a gate of the second FET and a plus terminal of the vehicle-mounted battery; a first surge voltage protection element connected between the gate of the second FET and the ground; a coil connected in series between a source of the first FET and the power supply control IC; a second resistor connected between the source of the first FET and a drain of the second FET; a capacitor connected to an input side of the power supply control IC; a third resistor connected in series between a gate of the first FET and the second FET; and a second surge voltage protection element connected to the input side of the power supply control IC.

According to the present invention, even if the voltage of a battery mounted on a vehicle drops to near an operable voltage of the ECU, it is possible to guarantee the operation of the ECU. Even if battery terminals are reversely connected, it is possible to protect an ECU internal circuit. Further, it is possible to protect the ECU internal circuit and prevent ECU reset when a surge occurs.

DETAILED DESCRIPTION OF THE INVENTION

Figure 1:
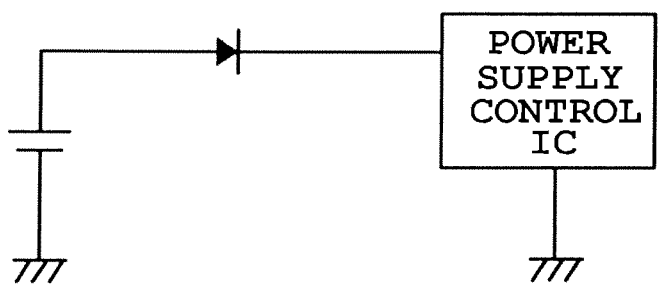
FIG. 1 is a diagram of a reverse polarity protection circuit in which a diode is used.

A revere polarity protection circuit in which a diode is used is explained with reference to FIG. 1. With a method of connecting the diode to a power supply input section of an ECU as shown in FIG. 1, even if a battery is reversely connected to the ECU, a path of an electric current flowing from a power supply control IC in the ECU to the battery is cut off by a rectifying action of the diode. Therefore, a voltage applied to the power supply control IC drops to nearly 0 V.

As explained above, the circuit shown in FIG. 1 is ideal as the reverse polarity protection circuit. However, if battery terminals are normally connected, a voltage drop equivalent to a forward voltage of the diode occurs. When a battery voltage drops to, for example, about an operable voltage of the ECU (e.g., 6 V), it is likely that a voltage for the ECU to operate is insufficient and ECU reset occurs.

A reverse polarity protection circuit in which a MOSFET is used instead of the diode and a voltage drop does not occur is explained with reference to FIG. 2.

Figure 2:
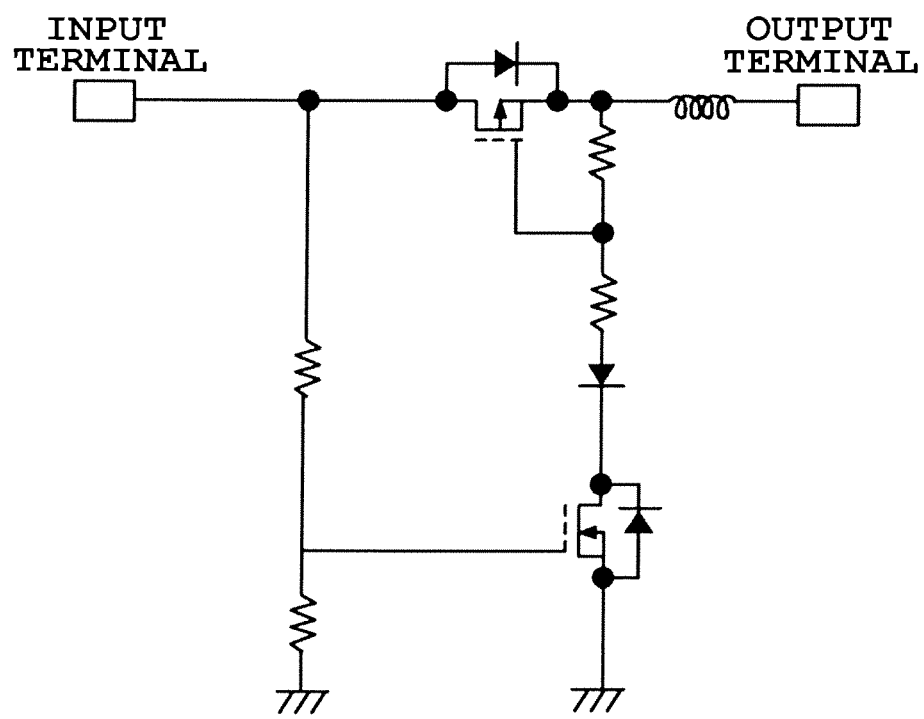
FIG. 2 is a diagram of a switching power supply circuit disclosed in JP-A-1-177865.

The circuit shown in FIG. 2 includes an FET for reverse polarity protection mounted between an input terminal and an output terminal, an FET for switching that performs switching of the FET; a resistor and a diode mounted between the two FETs, and a resistor for dividing a gate voltage. In such a configuration, when a surge occurs, the FET for switching is destroyed and an abnormal current flows from the input terminal. In the present invention, a zener diode is used for a gate of the FET for switching to prevent the FET from being destroyed when a surge occurs. Embodiments of the present invention are explained below with reference to the accompanying drawings.

First Embodiment

Figure 3:
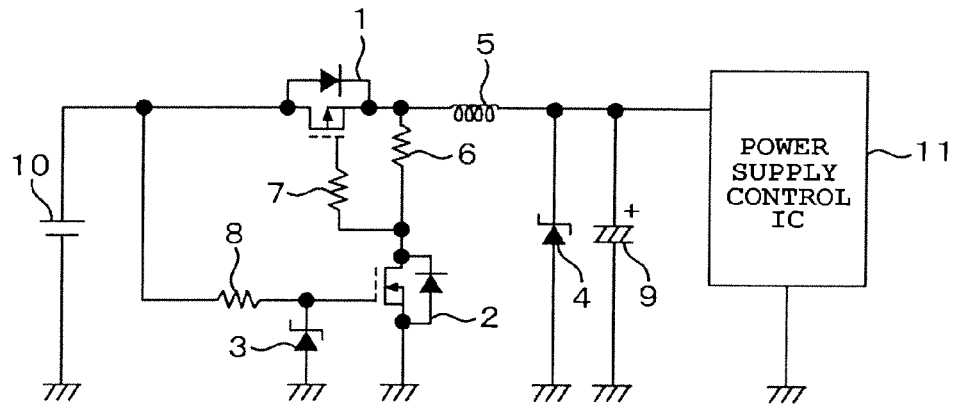
FIG. 3 is a diagram of a reverse polarity protection circuit that can guarantee operation at a battery voltage of 6 V.

FIG. 3 is a diagram of a reverse polarity protection circuit according to an embodiment of the present invention that can guarantee the operation of an ECU even if a battery voltage drops to about 6 V, which is an operable voltage of the ECU.

The reverse polarity protection circuit according to the embodiment shown in FIG. 3 includes a p-channel MOSFET 1, an n-channel MOSFET 2, a zener diode 3, a zener diode 4, a coil 5 that suppresses a backward flow of an electric current, a resistor 6 that retains a voltage difference between a source of the p-channel MOSFET 1 and a drain of the n-channel MOSFET 2, a resistor 7 that protects the circuit if short-circuit destruction of the p-channel MOSFET 1 occurs, a resistor 8 that protects the circuit if short-circuit destruction of the n-channel MOSFET 2 occurs, an electrolytic capacitor 9 that suppresses fluctuation in an input voltage to a power supply control IC 11, a battery 10 that supplies a voltage to the ECU, and the power supply control IC 11 that generates a voltage for causing an IC in the ECU to operate.

In FIG. 3, if terminals of the battery 10 are normally connected, a voltage is supplied to the power supply control IC 11 through a parasitic diode of the p-channel MOSFET 1. The n-channel MOSFET 2 is turned on and a gate of the p-channel MOSFET 1 is set to low, whereby a potential difference occurs between the gate and a source of the p-channel MOSFET 1. Since the p-channel MOSFET 1 is turned on, unlike the circuit shown in FIG. 1, a voltage drop does not occur between the battery 10 and the power supply control IC 11. Therefore, it is possible to guarantee the operation of the ECU even if the voltage of the battery 10 drops to about an ECU operable voltage of 6 V.

On the other hand, in FIG. 3, if the terminals of the battery 10 are reversely connected, since the n-channel MOSFET 2 changes to an OFF state and the p-channel MOSFET 1 is also in the OFF state, a path of an electric current flowing from the power supply control IC 11 to the battery 10 is cut off. Therefore, it is possible to prevent breakage of the power supply control IC 11.

In FIG. 3, during the normal operation of the ECU, when a minus surge occurs from a load connected to the terminals of the battery 10, the n-channel MOSFET 2 changes to the OFF state and the p-channel MOSFET 1 changes to the OFF state with the potential difference between the gate and the source eliminated. Therefore, the path of the electric current flowing from the power supply control IC 11 to the battery 10 is cut off. Therefore, a voltage supplied to the power supply control IC 11 is retained and ECU reset due to a battery voltage drop is prevented. From the occurrence of the minus surge until the p-channel MOSFET 1 is turned off, extraction of an electric current from the power supply control IC 11 in the direction of the battery 10 occurs. However, the coil 5 plays a role of delaying a phase of the extracted electric current and the electrolytic capacitor 9 plays a role of retaining the voltage supplied to the power supply control IC 11.

In FIG. 3, when a plus surge occurs in a voltage input section of the battery 10 during the normal operation of the ECU, a gate voltage of the n-channel MOSFET 2 is fixed to a zener voltage by the zener diode 3. Therefore, the n-channel MOSFET 2 is protected. If a short-circuit failure of the n-channel MOSFET 2 is caused by the resistor 8, it is possible to realize prevention of a short circuit between the battery 10 and the ground. Further, since the zener diode 4 protects the power supply control IC 11, it is possible to continue the normal operation of the ECU.

According to this embodiment, since the n-channel MOSFET 2 is protected even when a surge occurs, a function of switching the gate of the p-channel MOSFET 1 is guaranteed. Consequently, an abnormal current can be prevented from flowing to the power supply control IC 11. Therefore, it is possible to guarantee the operation of the ECU even when a surge occurs.

Second Embodiment

Figure 4:
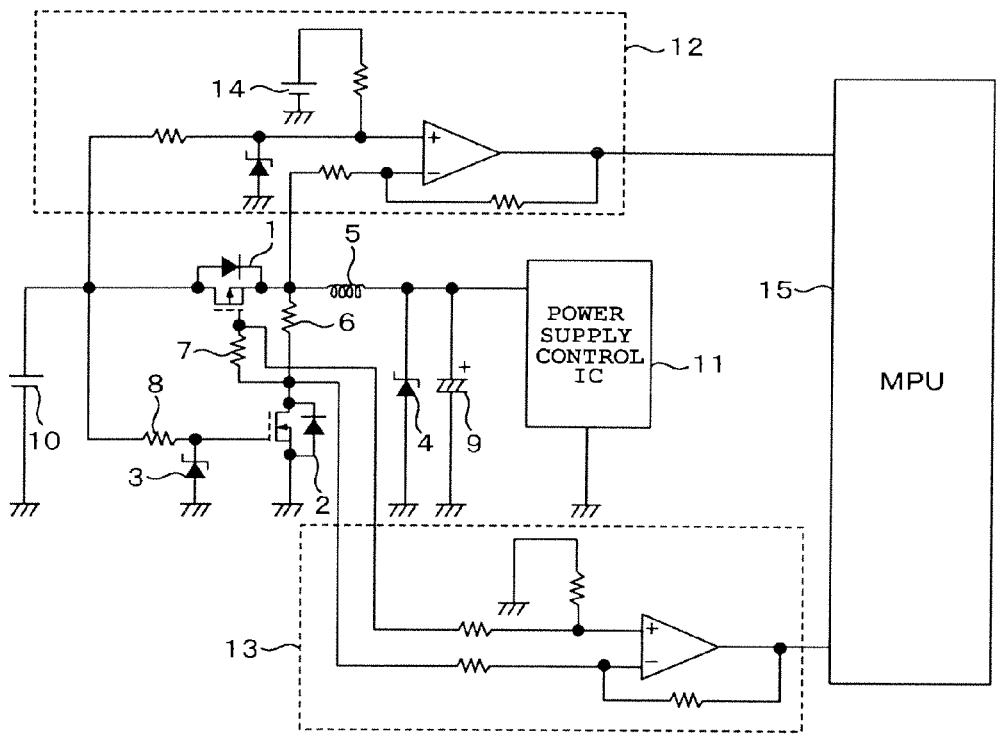
FIG. 4 is a diagram of a reverse polarity protection circuit with a diagnostic function.

FIG. 4 is a diagram of a reverse polarity protection circuit according to a second embodiment in which a failure diagnostic function of the p-channel MOSFET 1 is provided.

The reverse polarity protection circuit according to the second embodiment shown in FIG. 4 includes, in addition to the components of the circuit shown in FIG. 3, a differential amplifying circuit 12 that detects a voltage difference between the source and a drain of the p-channel MOSFET 1, a differential amplifying circuit 13 that detects a potential difference of the resistor 7, a reference voltage 14 of the differential amplifying circuit 12, and an MPU 15. The voltage from the power supply control IC 11 may be supplied to the MPU 15. The ECU may function as both of an MPU that performs an arithmetic operation for controlling a control target apparatus and the MPU 15.

If the p-channel MOSFET 1 is normal, when a differential amplification factor of the differential amplifying circuit 12 is represented as α, an ON resistance of the p-channel MOSFET 1 is represented as Ron, a drain-to-source current of the p-channel MOSFET 1 is represented as Ids, and a reference voltage is represented as X, an output A of the differential amplifying circuit 12 can be calculated as indicated by Expression (1) below.

$$A = \alpha \cdot Ron \cdot Ids + X \tag{1}$$

If an ON resistance increase failure of the p-channel MOSFET 1 occurs, a drain-to-source voltage rises and the output A of the differential amplifying circuit 12 exceeds a fixed value. Then, the MPU 15 determines that the p-channel MOSFET 1 breaks down.

If a short-circuit failure of the p-channel MOSFET 1 occurs, a voltage difference does not occur between the drain and the source. Therefore, the output A of the differential amplifying circuit 12 is equal to the reference voltage X.

If a short break or a minus surge occurs in the voltage input section of the battery 10, the output A of the differential amplifying circuit 12 instantaneously decreases to be equal to or lower than the reference voltage X until the ECU returns to the normal operation.

Figure 5:
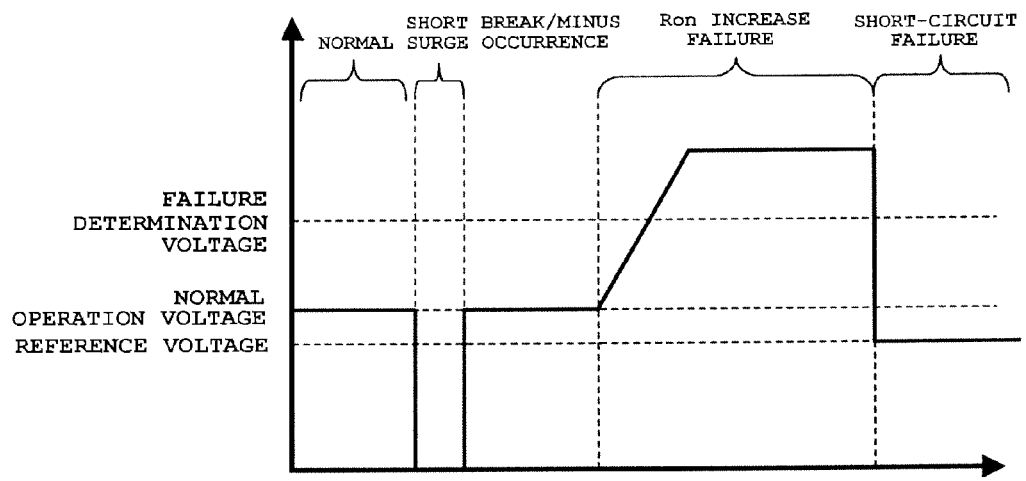
FIG. 5 is a diagnostic map during an ON resistance increase failure of a p-channel MOSFET in a second embodiment.

Therefore, according to a state change of the p-channel MOSFET 1, the output A of the differential amplifying circuit 12 can create a diagnostic map shown in FIG. 5. The ordinate of FIG. 5 represents the output A of the differential amplifying circuit 12 and the abscissa of FIG. 5 represents the state change of the p-channel MOSFET 1.

If the p-channel MOSFET 1 is normal, an electric current does not flow to the resistor 7. Therefore, an output B of the differential amplifying circuit 13 is equal to an offset voltage of an operational amplifier.

If a short-circuit failure of the p-channel MOSFET 1 occurs, when the resistance of the resistor 7 is represented as R7, a current value flowing to the resistor 7 is represented as I7, and a differential amplification factor of the differential amplifying circuit 13 is represented as β, the output B of the differential amplifying circuit 13 can be calculated as indicated by Expression (2) below.

$$B = \beta \cdot R7 \cdot I7 \quad (2)$$

Figure 6:
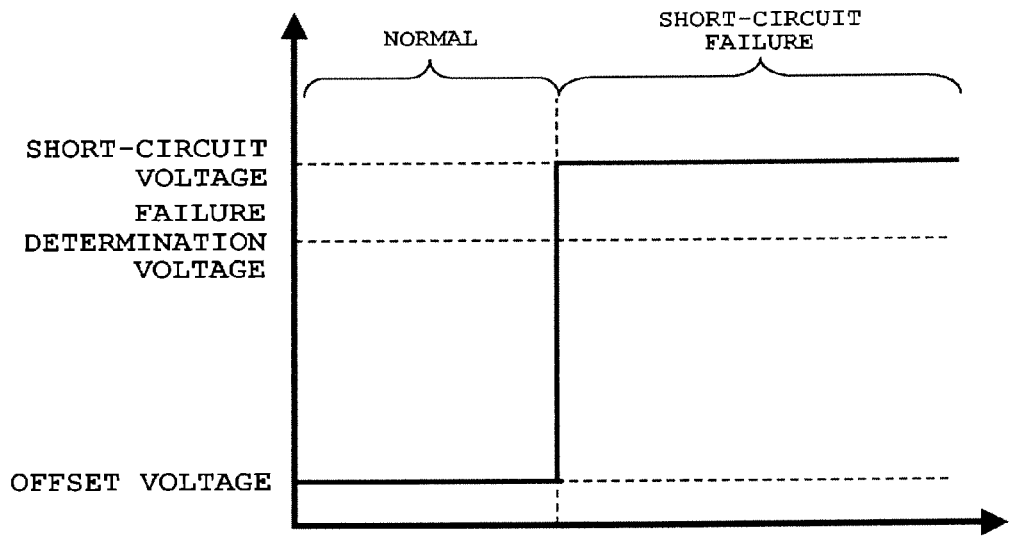
FIG. 6 is a diagnostic map during a short-circuit failure of the p-channel MOSFET in the second embodiment.

Therefore, according to the state change of the p-channel MOSFET 1, the output B of the differential amplifying circuit 13 can create a diagnostic map shown in FIG. 6. The ordinate of FIG. 6 represents the output B of the differential amplifying circuit 13 and the abscissa of FIG. 6 represents the state change of the p-channel MOSFET 1.

The MFP 15 can determine a failure of the p-channel MOSFET 1 by comparing the outputs A and B from the differential amplifying circuits 12 and 13 and the reference voltage 14, determination values stored in a ROM in the ECU in advance, and the like.

With the method explained above, when the MPU 15 determines a failure of the p-channel MOSFET 1, the MPU 15 outputs a signal from the ECU and turns on a warning lamp to inform a driver of abnormality and perform predetermined failsafe control.

Third Embodiment

Figure 7:
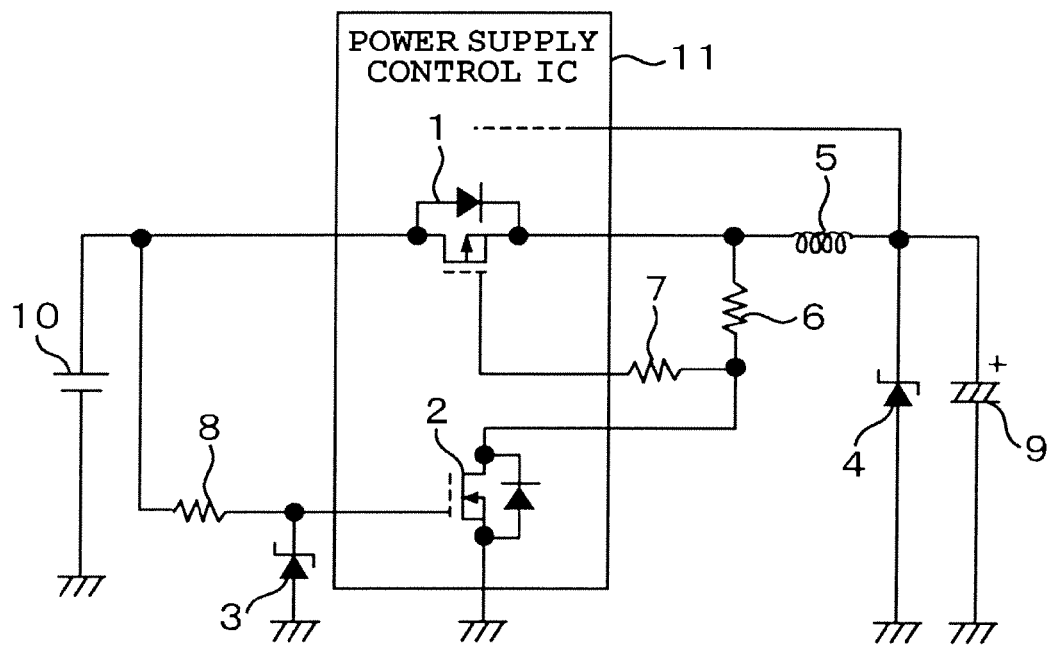
FIG. 7 is a diagram of a circuit in which a power supply input section is integrated with a power supply control IC.

FIG. 7 is a diagram of a reverse polarity protection circuit according to a third embodiment in which the p-channel MOSFET 1 and the n-channel MOSFET 2 shown in FIG. 3 are integrated in the power supply control IC 11 as one package. It is possible to reduce a mounting area by integrating the p-channel MOSFET 1 and the n-channel MOSFET 2 in the power supply control IC 11. The p-channel MOSFET 1 and the n-channel MOSFET 2 can be mounted as an ASIC as well.

Fourth Embodiment

Figure 8:
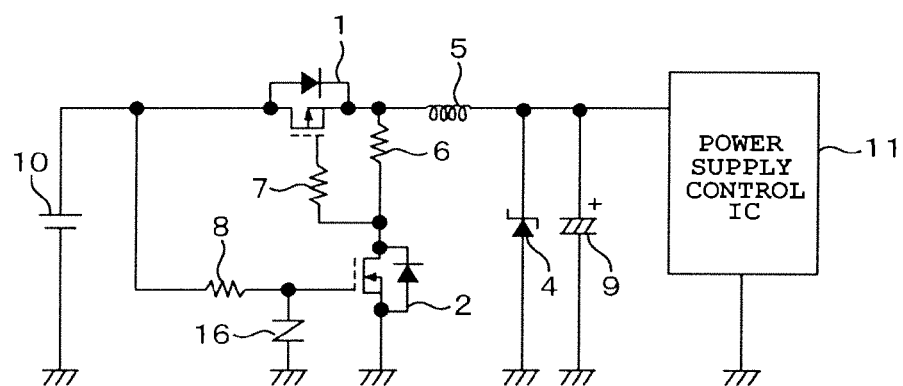
FIG. 8 is a diagram of a circuit in which a varistor is used for gate protection of an n-channel MOSFET.

FIG. 8 is a diagram of a reverse polarity protection circuit according to a fourth embodiment in which a varistor 16 is used instead of the zener diode 3 shown in FIG. 3. The varistor 16 has high electrical resistance when a voltage between both terminals is low and has low electrical resistance when the voltage between both the terminals is equal to or higher than a predetermined voltage. Therefore, even if the varistor 16 is used instead of the zener diode 3, when a surge occurs from the power supply input section of the battery 10, it is possible to protect a gate of the n-channel MOSFET 2.

Similarly, a varistor may be used instead of the zener diode 4.

What is claimed is:

1. An electronic control unit for automobile comprising:
   a first FET connected between a vehicle-mounted battery and a power supply control IC that lowers an output voltage from the vehicle-mounted battery to a predetermined value;
   a second FET configured to control ON and OFF of the first FET;
   a first resistor connected in series between a gate of the second FET and a plus terminal of the vehicle-mounted battery;
   a first surge voltage protection element connected between the gate of the second FET and ground;
   a coil connected in series between a source of the first FET and the power supply control IC;
   a second resistor connected between the source of the first FET and a drain of the second FET;
   a capacitor connected to an input side of the power supply control IC;
   a third resistor connected in series between a gate of the first FET and the second FET; and
   a second surge voltage protection element connected to the input side of the power supply control IC.

2. The electronic control unit for automobile according to claim 1, further comprising:
   a first differential amplifying circuit configured to detect a voltage difference between the source and a drain of the first FET; and
   a second differential amplifying circuit configured to detect a voltage difference between both ends of the third resistor, wherein
   the electronic control unit for automobile diagnoses a failure of the first FET on the basis of an output of the first differential amplifying circuit and an output of the second differential amplifying circuit.

3. The electronic control unit for automobile according to claim 2, wherein, in the first FET and the second FET, parasitic diodes are respectively provided in parallel to the first FET and the second FET.

4. The electronic control unit for automobile according to claim 2, wherein, if terminals of the battery are reversely connected, the second FET is turned off, whereby the first FET changes to an OFF state.

5. The electronic control unit for automobile according to claim 4, wherein, when a minus surge occurs from a load connected to the terminals of the vehicle-mounted battery, the electronic control unit for automobile cuts off a path of an electric current flowing from the power supply control IC to the vehicle-mounted battery.

6. The electronic control unit for automobile according to claim 2, wherein, when a plus surge occurs from the terminals of the battery, the second surge voltage protection element protects the second FET.

7. The electronic control unit for automobile according to claim 2, wherein, when a proper voltage is applied from the terminals of the battery, the first FET and the second FET change to an ON state and a voltage is input to the power supply control IC.

8. A protection circuit for an electronic control unit for automobile, comprising:
   a first FET connected between a vehicle-mounted battery and a power supply control IC that lowers an output voltage from the vehicle-mounted battery to a predetermined value;
   a second FET configured to control ON and OFF of the first FET;
   a first resistor connected in series between a gate of the second FET and ground;
   a first surge voltage protection element connected between the gate of the second FET and the ground;
   a coil connected in series between a source of the first FET and the power supply control IC;
   a second resistor connected between the source of the first FET and a drain of the second FET;
   a capacitor connected to an input side of the power supply control IC;
   a third resistor connected in series between a gate of the first FET and the second FET; and
   a second surge voltage protection element connected to the input side of the power supply control IC;
   a first differential amplifying circuit configured to detect a voltage difference between the source and a drain of the first FET; and a second differential amplifying circuit configured to detect a voltage difference between both ends of the third resistor.

* * * * *